(12) United States Patent
Meshenky et al.

(10) Patent No.: US 10,619,946 B2
(45) Date of Patent: Apr. 14, 2020

(54) HEAT EXCHANGER FOR COOLING A FLOW OF COMPRESSED AIR USING A LIQUID COOLANT

(71) Applicant: Modine Manufacturing Company, Racine, WI (US)

(72) Inventors: Steven Meshenky, Mt. Pleasant, WI (US); Christopher Michael Moore, Racine, WI (US)

(73) Assignee: MODINE MANUFACTURING COMPANY, Racine, WI (US)

( * ) Notice: Subject to any disclaimer, the term of this patent is extended or adjusted under 35 U.S.C. 154(b) by 478 days.

(21) Appl. No.: 15/042,806

(22) Filed: Feb. 12, 2016

(65) Prior Publication Data

US 2016/0245597 A1    Aug. 25, 2016

Related U.S. Application Data

(60) Provisional application No. 62/119,426, filed on Feb. 23, 2015.

(51) Int. Cl.
*F28D 9/00* (2006.01)
*F28F 9/02* (2006.01)
(Continued)

(52) U.S. Cl.
CPC ........ *F28F 9/0248* (2013.01); *F02B 29/0462* (2013.01); *F28D 9/005* (2013.01);
(Continued)

(58) Field of Classification Search
CPC .... F28F 9/02; F28F 9/00; F28F 9/0256; F28F 9/0006; F28F 9/0248; F28F 3/08; F28F 3/025; F28D 9/00; F28D 9/0006
(Continued)

(56) References Cited

U.S. PATENT DOCUMENTS 2,677,531 A * 5/1954 Hock, Sr. ................ F28F 3/083
165/167
3,334,399 A    8/1967 Teeguarden
(Continued)

FOREIGN PATENT DOCUMENTS

| DE | 4106963 A1 * | 9/1992 | ............... F01P 11/08 |
| EP | 1646780 B1 | 7/2008 | |
| EP | 2450657 A1 | 5/2012 | |

OTHER PUBLICATIONS

Chinese Patent Office Action for Application No. 201610096478.8 dated Nov. 27, 2017 (20 pages, English translation included).
(Continued)

*Primary Examiner* — Travis C Ruby
*Assistant Examiner* — Harry E Arant
(74) *Attorney, Agent, or Firm* — Michael Best & Friedrich LLP; Jeroen Valensa; Michael Bergnach (57) ABSTRACT

A heat exchanger for cooling a flow of compressed air using a liquid coolant includes a stack of coolant flow plates extending in a stacking direction. An enclosure surrounds the stack of coolant flow plates to at least partially define the flow path for the compressed air, and includes a first wall generally arranged in a plane parallel to the stacking direction, a second wall joined to the first wall and generally arranged in a second plane perpendicular to the stacking direction, a coolant port provided on an external surface of the first wall, an aperture provided on an internal surface of the second walls, and a coolant flow path extending through the interior of both the first wall and the second wall between the coolant port and the aperture.

13 Claims, 7 Drawing Sheets

(51) Int. Cl.
*F02B 29/04* (2006.01)
*F28F 9/00* (2006.01)

(52) U.S. Cl.
CPC ............ *F28F 9/001* (2013.01); *F28F 9/0253* (2013.01); *Y02T 10/146* (2013.01)

(58) Field of Classification Search
USPC .............................................. 165/153, 170
See application file for complete search history.

(56) References Cited

U.S. PATENT DOCUMENTS

| | | | |
|---|---|---|---|
| 4,823,868 A | 4/1989 | Neebel | |
| 5,529,117 A * | 6/1996 | Voss | F28F 9/0256 165/144 |
| 6,129,394 A | 10/2000 | Bathla | |
| 6,241,011 B1 | 6/2001 | Nakamura et al. | |
| 6,378,603 B1 | 4/2002 | Shimoya et al. | |
| 7,011,142 B2 | 3/2006 | Davies et al. | |
| 8,286,615 B2 | 10/2012 | Dehnen et al. | |
| 8,528,629 B2 * | 9/2013 | Kalbacher | F02B 29/0412 165/140 |
| 8,596,339 B2 | 12/2013 | Palanchon | |
| 2007/0181105 A1 | 8/2007 | Bazika | |
| 2007/0271910 A1 * | 11/2007 | Chanfreau | F02B 29/0418 60/320 |
| 2008/0169093 A1 * | 7/2008 | Ohfune | F28D 7/1684 165/164 |
| 2010/0096101 A1 | 4/2010 | Braun et al. | |
| 2011/0168365 A1 * | 7/2011 | Garret | F02B 29/0462 165/148 |
| 2012/0210955 A1 * | 8/2012 | Keerl | F02B 29/0462 123/41.56 |
| 2012/0285423 A1 * | 11/2012 | Nguyen | F02B 29/0475 123/542 |
| 2013/0032319 A1 | 2/2013 | Kinder et al. | |
| 2013/0213621 A1 | 8/2013 | Pierre et al. | |
| 2014/0224458 A1 | 8/2014 | Dornseif et al. | |
| 2014/0246186 A1 * | 9/2014 | Bruggesser | F02B 29/0462 165/168 |

OTHER PUBLICATIONS

The State Intellectual Property Office of the People's Republic of China, Notification of the Second Office Action, Chinese Patent Application No. 201610096478.8, dated Jul. 30, 2018.
Chinese Patent Office Action for Application No. 201610096478.8 dated Jul. 30, 2018 (22 pages).
First Examination Report for Indian Patent Application No. 201614005183 dated Mar. 29, 2019, Intellectual Property India (7 pages).

* cited by examiner

HEAT EXCHANGER FOR COOLING A FLOW OF COMPRESSED AIR USING A LIQUID COOLANT

CROSS-REFERENCE TO RELATED APPLICATIONS

This application claims priority to U.S. Provisional Patent Application No. 62/119,426 filed Feb. 23, 2015, the entire contents of which are hereby incorporated by reference herein.

BACKGROUND

Charge air coolers are used in conjunction with turbocharged internal combustion engine systems. In such systems, residual energy from the combustion exhaust is recaptured through an exhaust expansion turbine, and the recaptured energy is used to compress or "boost" the pressure of the incoming air (referred to as the "charge air") being supplied to the engine. This raises the operating pressure of the engine, thereby increasing the thermal efficiency and providing greater fuel economy.

The compression of the charge air using the exhaust gases typically leads to a substantial increase in temperature of the air. Such a temperature increase can be undesirable for at least two reasons. First, the density of the air is inversely related to its temperature, so that the amount of air mass entering the combustion cylinders in each combustion cycle is lower when the air temperature is elevated, leading to reduced engine output. Second, the production of undesirable and/or harmful emissions, such as oxides of nitrogen, increases as the combustion temperature increases. The emissions levels for internal combustion engines is heavily regulated, often making it necessary to control the temperature of the air entering the combustion chambers to a temperature that is relatively close to the ambient air temperature. As a result, cooling of the charge air using charge air coolers has become commonplace for turbocharged engines.

In some applications, the charge air is cooled using a liquid coolant (for example, engine coolant). Some known types of these liquid cooled charge air coolers include a metallic core with sealed liquid passages arranged in heat transfer relation to air passages, and a housing surrounding the core to direct the flow of charge air through the air passages.

SUMMARY

According to an embodiment of the invention, a heat exchanger for cooling a flow of compressed air using a liquid coolant includes a stack of coolant flow plates extending in a stacking direction. Air fins are arranged between adjacent ones of the coolant flow plates to provide flow paths through the heat exchanger for the flow of compressed air. A coolant inlet manifold and a coolant outlet manifold are defined by the stack of coolant plates. An enclosure surrounds the stack of coolant flow plates to at least partially define the flow path for the compressed air, and includes a first wall generally arranged in a plane parallel to the stacking direction, a second wall joined to the first wall and generally arranged in a second plane perpendicular to the stacking direction, a coolant port provided on an external surface of the first wall, an aperture provided on an internal surface of the second walls, and a coolant flow path extending through the interior of both the first wall and the second wall between the coolant port and the aperture. A seal is arranged between the aperture and the stack of coolant flow plates to provide leak-free communication between the coolant port and one of the coolant manifolds.

In some embodiments, the heat exchanger includes a second port, a second aperture, and a second coolant flow path extending through the interior of both the first wall and the second wall between the second coolant port and the second aperture. The second coolant flow path is separate from the first coolant flow path. A second seal provides leak-free communication between the second port and the other manifold.

In some embodiments, the first wall and the second wall are both formed as part of a single unitary part. In some such embodiments the single unitary part is a molded plastic part, and in other embodiments the single unitary part is a cast aluminum part. In some embodiments the stack of coolant flow plates, the air fins, and the enclosure are joined together by braze joints, and the seal is provided by braze joints.

According to another embodiment of the invention, a heat exchanger for cooling a flow of compressed air using a liquid coolant includes a stack of coolant flow plates extending in a stacking direction. Air fins are arranged between adjacent ones of the coolant flow plates to provide flow paths through the heat exchanger for the flow of compressed air. A coolant inlet manifold and a coolant outlet manifold are defined by the stack of coolant plates. An enclosure surrounds the stack of coolant flow plates to at least partially define the flow path for the compressed air, and includes one or more externally facing surfaces, one or more internally facing surfaces, a coolant port provided on one of the externally facing surfaces, an aperture provided on one of the internally facing surfaces, and a coolant flow path extending between the coolant port and the aperture. The coolant flow path is at least partially located between the internally facing surfaces and the externally facing surfaces. A seal is arranged between the aperture and the stack of coolant flow plates, and provides leak-free fluid communication between the coolant port and one of the coolant manifolds.

In some embodiments, the coolant flow path includes a first portion extending in a direction that is generally parallel to the stacking direction, and a second portion extending in a direction that is generally perpendicular to the stacking direction. In some embodiments the coolant flow path includes at least one right hand turn between the coolant port and the aperture, and in some embodiments at least two right hand turns.

In some embodiments the stack of coolant flow plates, the air fins, and the enclosure are joined together by braze joints. In some embodiments the seal between the aperture and the stack of coolant flow plates is provided by braze joints.

In some embodiments the enclosure includes a first formed sheet metal part and a second formed sheet metal part. The first formed sheet metal part has a first and a second port receiving opening to receive a first and a second coolant port, respectively. The second formed sheet metal part has a first and a second aperture. The first and second formed sheet metal parts together define a first coolant flow path extending between the first coolant port and the first aperture, and a second coolant flow path extending between the second coolant port and the second aperture.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
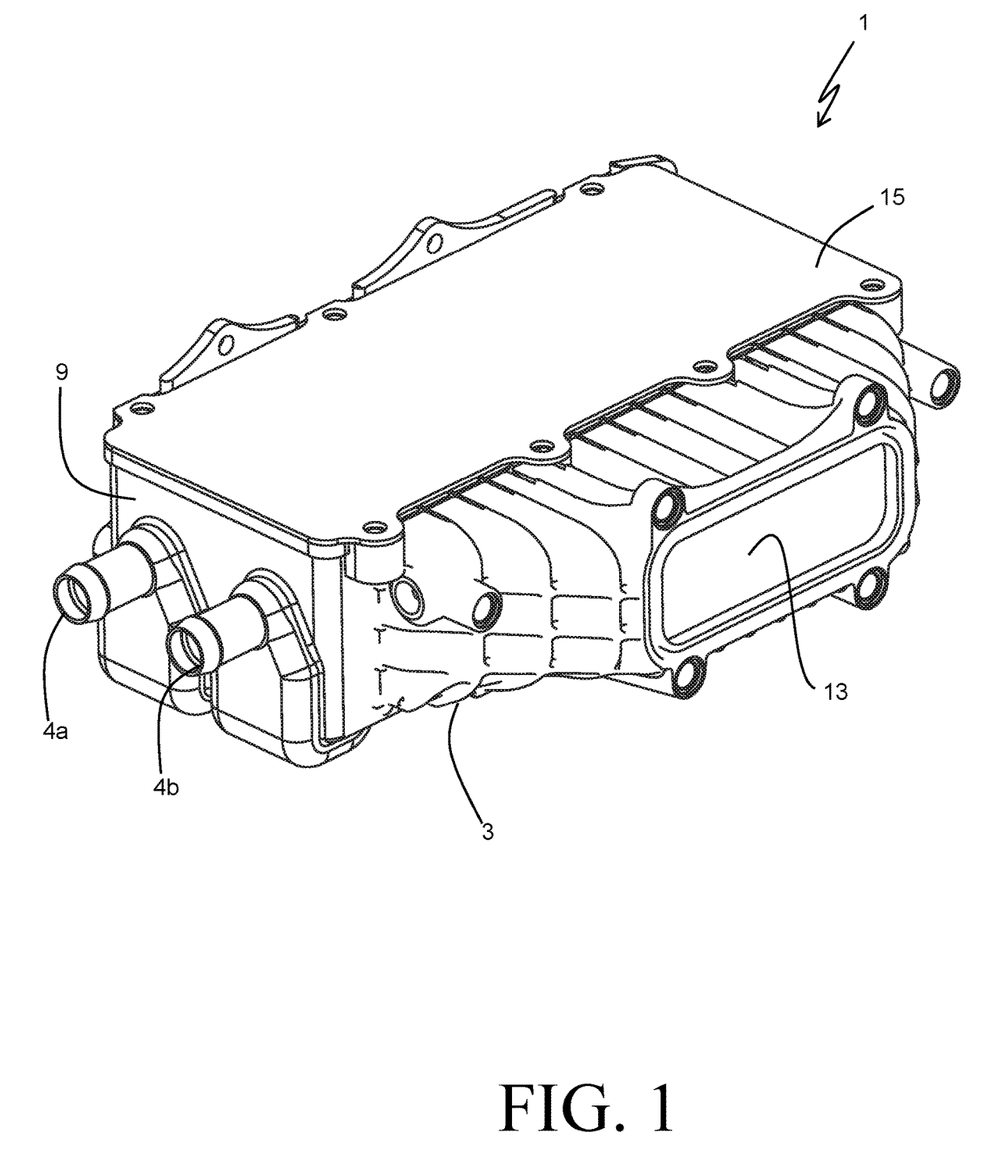
FIG. 1 is a perspective view of a heat exchanger according to an embodiment of the invention.

FIG. 1 depicts a heat exchanger 1 according to an embodiment of the invention. The heat exchanger 1 can be used as a charge air cooler to cool a flow of compressed air using a liquid coolant, among other purposes. The heat exchanger 1 can be especially suitable for use in an engine system, such as for a vehicle, and can be directly or indirectly coupled to a turbocharged or supercharged engine in order to cool compressed charge air from a turbocharger or supercharger prior to delivery of such air to the intake manifold of the engine.

Figure 2:
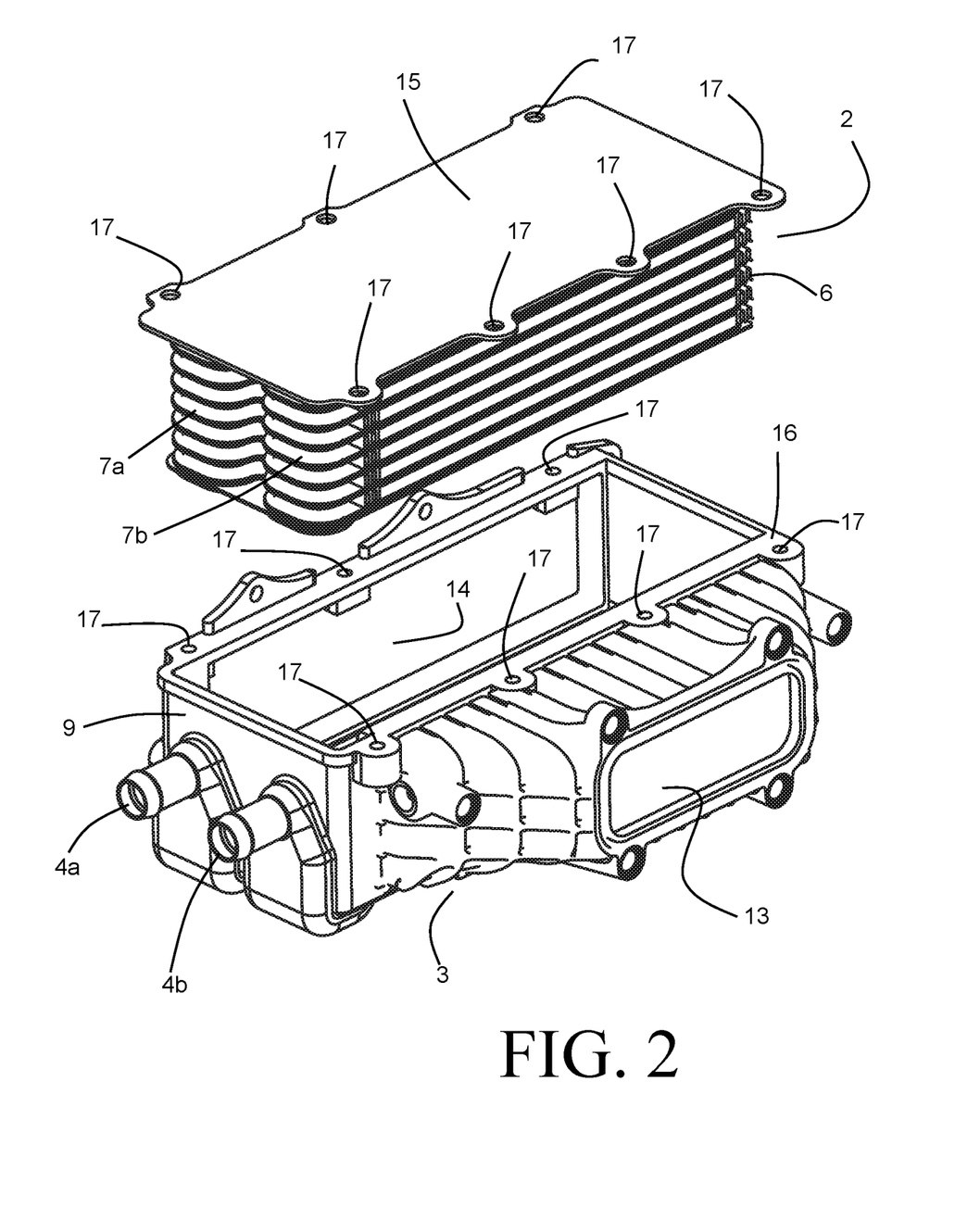
FIG. 2 is an exploded perspective view of the heat exchanger of FIG. 1.
Figure 3:
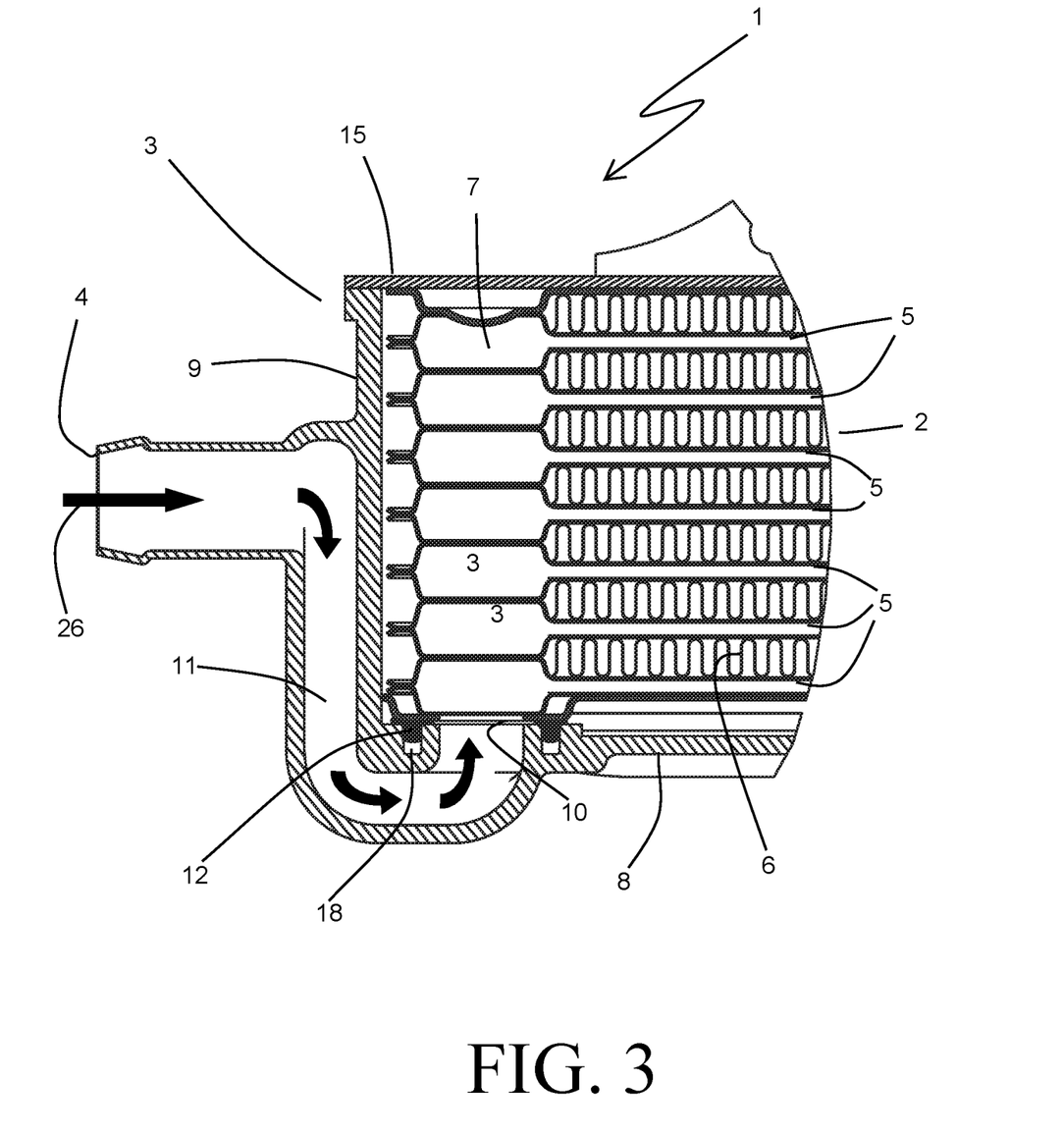
FIG. 3 is a partial sectional side view of the heat exchanger of FIG. 1.

The heat exchanger 1 includes (as best seen in FIGS. 2 and 3) a metallic heat exchange core formed as a stack 2 of coolant plates 19, which is inserted into an enclosure 3. The enclosure 3 includes an air inlet 13 which can be coupled to a source of compressed air (e.g. a turbocharger or supercharger outlet) and an air outlet 14 which can be coupled, either directly or indirectly, to the intake manifold of the engine. The stack 2 of coolant plates is located within an internal volume bounded by the internally facing surfaces of the enclosure 3 between the air inlet 13 and the air outlet 14, so that compressed air passing through the heat exchanger 1 from the inlet 13 to the outlet 14 is directed through the stack 2.

Adjacent ones of the individual coolant plates 19 are joined at their corresponding edges to form coolant flow passages 5 within the stack 2, the coolant flow passages 5 being sealed from the internal volume of the enclosure 3 to prevent mixing between the air passing therethrough and the coolant. Air fins 6 are arranged between, and joined to, the coolant plates 19 in order to provide flow channels for the air passing through the heat exchanger 1. In this manner, the stack 2 provides alternating coolant passages and air passages to promote the efficient transfer of heat from the air to the coolant, thereby cooling the air.

The coolant passages 5 extend between coolant manifolds 7, formed by upturned flanges of the individual coolant plates 19 and extending in the stacking direction of the coolant plates 19, as best seen in FIG. 3. In the exemplary embodiment, as best seen in the exploded view of FIG. 2, a coolant manifold 7a and a coolant manifold 7b are provided at a common end of the stack 2, so that the coolant flow channels 5 describe a U-shaped flow path through the stack 2. In other embodiments the manifolds 7 can be provided at opposing ends of the stack 2.

The stack 2 of coolant plates is capped at one end by a mounting plate 15, which is somewhat larger in size than the coolant plates 19 so that its periphery extends out beyond the footprint of the plates 19. Upon insertion of the stack 2 into the enclosure 3, the exposed periphery of the mounting plate 15 rests upon a top surface 16 of the enclosure 3. Corresponding mounting features 17 on the mounting plate 15 and the top surface 16 can be used to structurally secure the stack 2 to the enclosure 3 (by, for example, threaded fasteners, rivets, or the like). Although not shown, a seal (for example, a gasket) can be provided at the interface between the mounting plate 15 and the top surface 16 in order to prevent air leakage at that interface. Alternatively, the mating surfaces can be otherwise sealed (e.g. by adhesives, welding, etc.)

In some especially preferable embodiments the components of the stack 2 (e.g. the coolant plates 19, air fins 6, and top plate 15) are formed of aluminum alloy and are brazed together to form a monolithic component.

Previously known heat exchangers employed for such purposes have included coolant ports formed as part of the metallic heat exchange core, for example by brazing port stubs into the top mounting plate to communicate with the coolant manifolds. In certain applications, however, such placement of coolant ports, and the associated coolant lines connected to the ports in order to interconnect the heat exchanger with the coolant system, can be problematic. By way of example, placement of the coolant ports may be made difficult by the placement of other engine components directly adjacent to certain portions of the heat exchanger. Additionally, the need to maintain access to the coolant ports after installation, e.g. for purposes of coupling and uncoupling coolant lines (such as may be required for service or routine maintenance), can impose restrictions on the allowable placement of the coolant ports.

Such difficulties are addressed in the heat exchanger 1 through coolant ports 4 provided on an outwardly facing surface of the enclosure 3. Packaging of the heat exchanger 1 into the engine system can be greatly simplified through such advantageous placement of the coolant ports 4 on the side of the enclosure, 3, rather than extending through the top plate 15 of the stack 2. During operation, coolant 26 is received into one of the ports 4a, 4b from a coolant system and is directed into a corresponding one of the coolant manifolds 7a, 7b. Similarly, the coolant, after having passed through the coolant passages 5, is delivered from the other of the coolant manifolds 7a, 7b to the other of the ports 4a, 4b to be returned to the coolant system.

The routing of coolant between the ports 4 and the manifolds 7 is accomplished by way of coolant flow paths 11 extending through the interior of walls of the enclosure 3. Such a coolant flow path 11 is shown, for the exemplary embodiment of FIG. 1, in the partial sectional view of FIG. 3, depicting a cross-section extending through one of the ports 4 and a corresponding one of the manifolds 7. It should be noted that the sectional view of FIG. 3 applies equally to either of the ports 4a, 4b and corresponding coolant manifolds 7a, 7b.

As shown in FIG. 3, the coolant flow path 11 connecting a port 4 to a coolant manifold 7 is formed into the enclosure 3. The enclosure 3 is constructed as a unitary piece through for example, plastic injection molding, rotational molding, metal injection molding, sand casting, lost core casting, die casting, or other known manufacturing means capable of producing such a net shape. In some embodiments the enclosure 3 can be constructed as a multi-piece assembly. Suitable materials for the construction of the enclosure 3 include (without limitation) structural plastics, aluminum alloys, and magnesium.

The enclosure 3 is bounded by several outer walls arranged so the internally facing surfaces of the walls enclose the internal volume, with access provided for insertion of the stack 2 such that the top plate 15 provides the remaining wall required to fully enclose the internal volume (with the obvious exception of the air inlet 13 and air outlet 14). In order to prevent the undesirable bypass of air around the stack 2, it is especially desirable for those enclosure walls surrounding the stack 2 to be relatively closely arranged to the stack 2. Accordingly, the enclosure 3 includes a wall 9 generally arranged to be in a plane parallel to the stacking direction of the coolant plates 19 that form the stack 2. Such an arrangement of the wall 9 enables a relatively close spacing of the edge of the stack 2 to the wall 9 in order to minimize the undesirable bypass of air.

It should be understood that the terminology "generally arranged to be . . . parallel" as used herein is not meant to imply that the wall is completely parallel to the stacking direction. Manufacturing concerns might dictate, for example, that a draft angle be included on a wall in order to ensure reliable ejection from a die or mold. A wall might, therefore, deviate from truly parallel by five degrees and still be considered generally parallel.

The coolant ports 4 are directly joined to an externally facing surface of the wall 9. In the exemplary embodiment the ports 4 are integrally formed with the wall 9, although in some alternative embodiments the ports 4 can be formed separately from, and subsequently be joined to, the wall 9. While the exemplary shows both ports 4a and 4b placed alongside each other on the wall 9, it should be understood that the invention allows for wide latitude in the location of the ports 4 along the periphery of the enclosure 3, and that in some embodiments it may be preferable to only have a single one of the ports 4 arranged on the wall 9, with the other one of the ports 4 arranged elsewhere.

The wall 9 is joined to another wall 8 of the enclosure 3, with the wall 8 arranged to be in a plane generally perpendicular to the stacking direction of the coolant plates 19 that form the stack 2. Again, the term "generally arranged to be . . . perpendicular" is not meant to imply complete perpendicularity. Generally speaking, the wall 8 is arranged to be spaced a uniform distance from the top plate 15 of the stack 2, so that bypass of air between the enclosure 3 and the bottom-most one of the coolant plates 19 can be minimized.

As shown in FIG. 3, the coolant flow path 11 extends through the interior of both the wall 8 and the wall 9 in order to provide a continuous flow path for coolant between the port 4 and the manifold 7. Taking as an example the case where the port 4 is functioning as a coolant inlet port for the heat exchanger 1, a flow of coolant 26 is received into the port 4; turns ninety degrees to flow along a portion of the flow path 11 in a direction parallel to the stacking direction; turns ninety degrees to flow in a direction perpendicular to the stacking direction; and turns ninety degrees again to flow in a direction parallel to the stacking direction and into the manifold 7. An aperture 10 is provided on an internal surface of the wall 8 to allow the flow of coolant to transition between the manifold 7 and the flow path 11.

Figure 4:
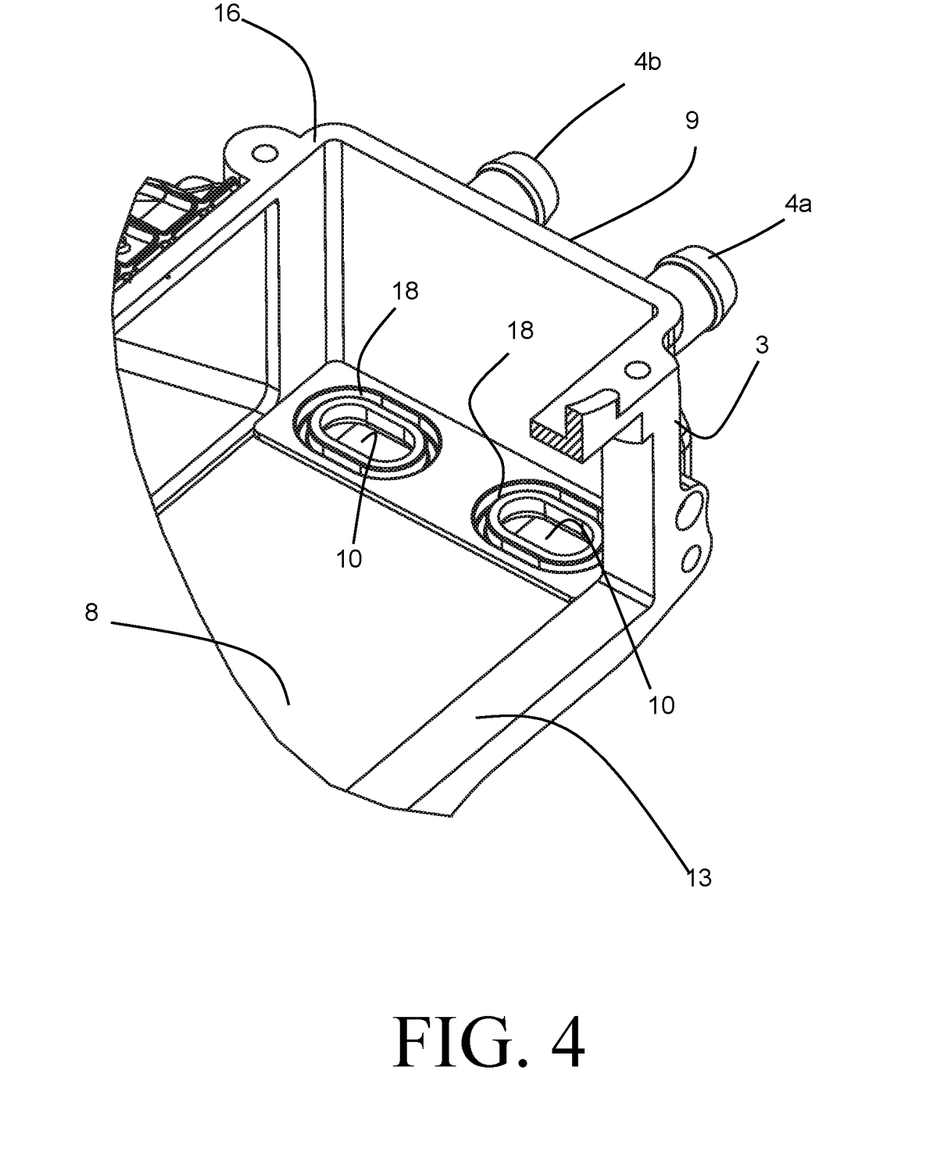
FIG. 4 is a partial perspective view of select portions of the heat exchanger of FIG. 1.

A leak-free connection between the coolant manifold 7 and the flow channel 11 is provided by a seal arranged at the aperture 10. In the exemplary embodiment of FIG. 3, the seal is provided by way of a compressible gasket 12 partially retained within a groove 18 surrounding the aperture 10 (shown in greater detail in FIG. 4). As the core stack 2 is inserted into the enclosure 3 and the top plate 15 is secured to the top surface 16 of the enclosure 3, the gasket 12 is compressed to form a seal around the aperture 10. The aperture 10 is of a shape and size that corresponds to the manifold 7, so that a fluid-tight seal is created to prevent leakage of coolant into the enclosure 3.

As evidenced by FIGS. 1 and 2, the walls of the enclosure 3 need not have a uniform thickness along their extents. In other words, each wall can have varying distances between its internally facing surface or surfaces and its externally facing surface or surfaces. In particular, it can be advantage for the thickness of the walls to be increased in the area of a coolant flow channel 11 in order to provide sufficient flow area for the coolant passing along that channel.

Figure 5:
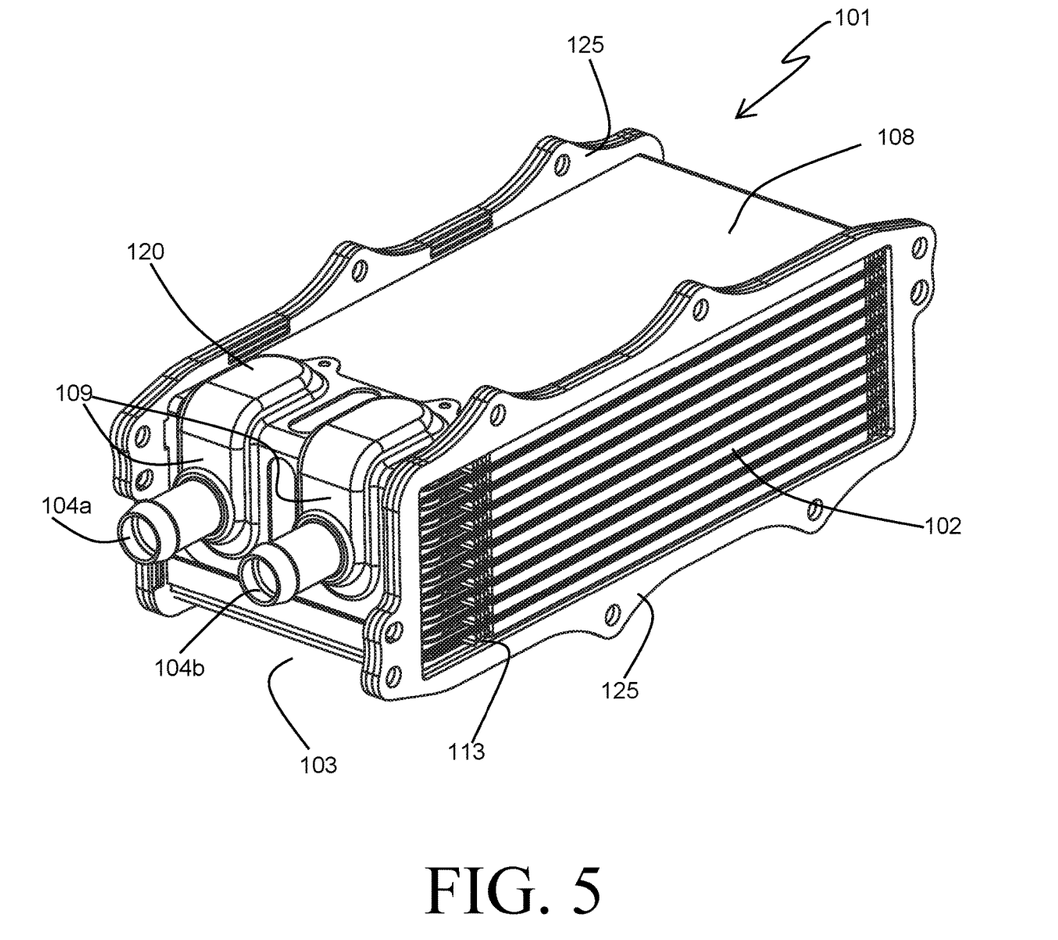
FIG. 5 is a perspective view of a heat exchanger according to another embodiment of the invention.
Figure 6:
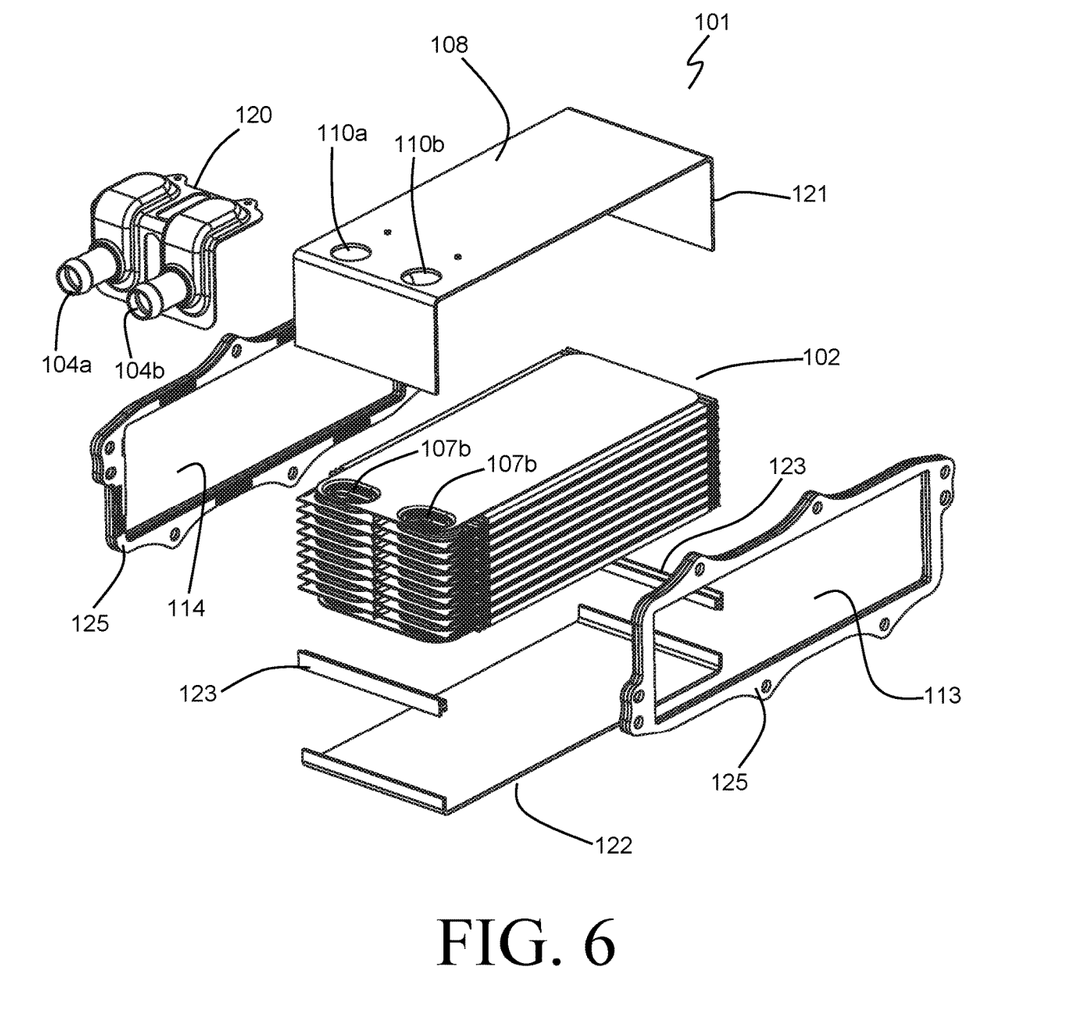
FIG. 6 is an exploded perspective view of the heat exchanger of FIG. 5.
Figure 7:
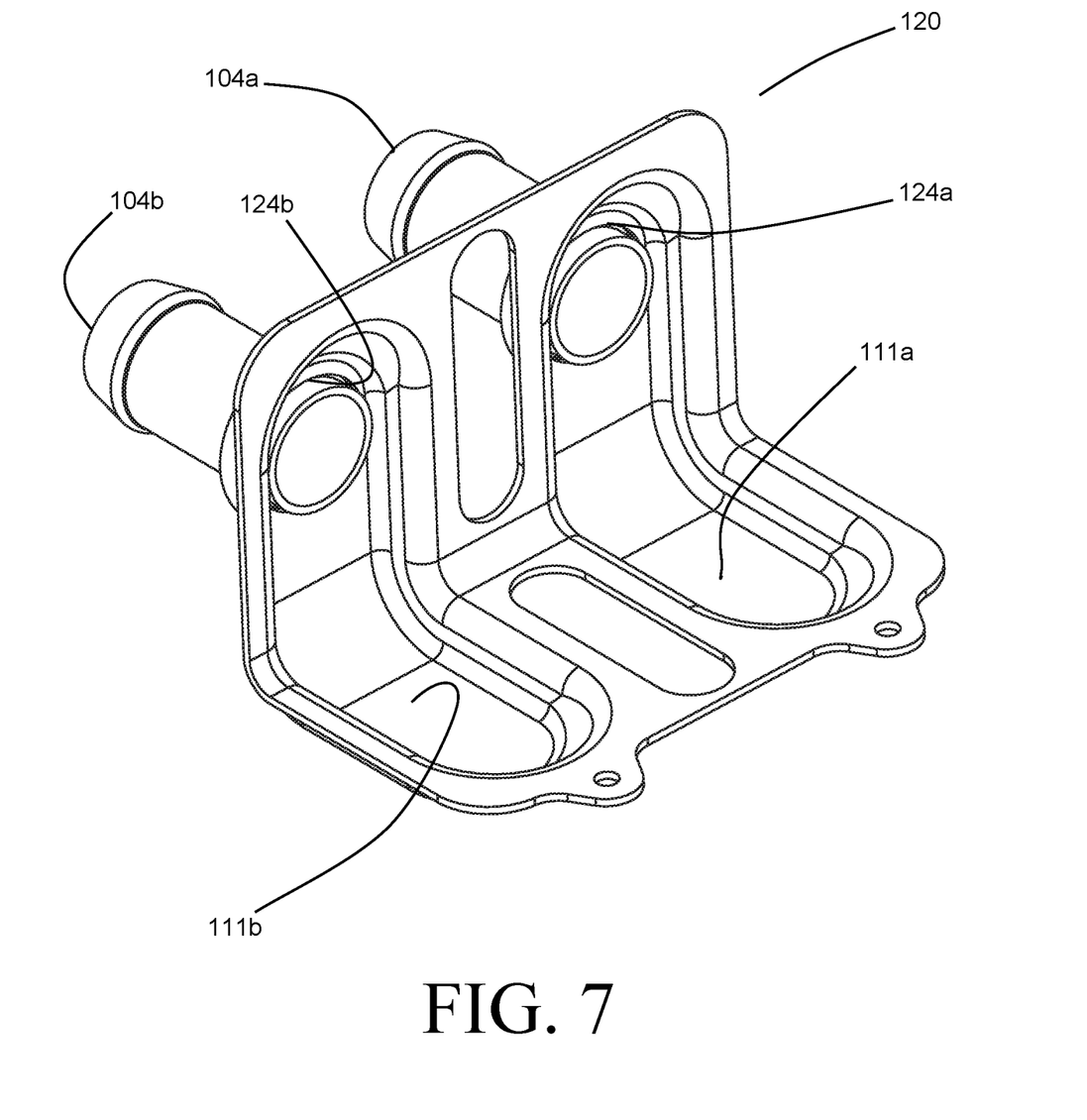
FIG. 7 is a perspective view of a component used to construct the heat exchanger of FIG. 5.

An alternative embodiment of the invention is depicted in FIGS. 5-7. The heat exchanger 101 depicted in these figures is also especially suitable for use as a charge air cooler to cool a low of compressed air using a liquid coolant, and may find particular utility within an engine system. The core stack 102 is generally similar to the previously described core stack 2 of heat exchanger 1, except for the absence of a top plate in the stack 102.

The heat exchanger 101 is primarily distinguished form the previously described heat exchanger 1 in the particular construction of the enclosure. The heat exchanger 101 has an enclosure 103 that is fashioned from several joined together metal parts. A first part 121 formed from a metal sheet partially envelops the core stack 102 on three sides, particularly on the top of the stack 102 (i.e. adjacent to a terminal one of the plates of the stack in the core stacking direction) and on the two adjacent sides of the stack extending parallel to the direction of air flow through the core stack 102. A second part 122 formed from a metal sheet partially also partially envelops the core stack 102 on three sides, particularly on the bottom of the stack 102 and on the aforementioned two adjacent sides. Joining parts 123 receive the ends of the parts 121, 122 along the two adjacent sides in order to join the parts 121, 122 into a continuous enclosure along the two adjacent sides. An air-tight sealed joint can be created between these parts by, for example, brazing, welding, or the like.

It should be understood that reference to a particular end of the core stack as a "top" or a "bottom" is merely done as a matter of convenience in matching the depicted orientation of the heat exchanger 101 within the figures, and does not necessarily dictate or imply an orientation of the heat exchanger 101 when installed.

The enclosure 103 additionally includes a pair of opposing mounting flanges 125 arranged at the remaining two sides of the core stack 102. The mounting flanges 125 are of a frame-like construction, and define an air inlet 113 at one side of the core stack 102, and an air outlet 114 at the other opposing end. The previously described components of the enclosure 103 (the parts 121, 122, and 123) are partially received into the inlet 113 and the outlet 114 and are sealingly joined to the mounting flanges 125 in order to provide a sealed air flow path extending through the enclosure 103 between the air inlet 113 and the air outlet 114.

A formed part 120 is joined to the part 121, and together the parts 120 and 121 define walls 108 and 109 of the enclosure 103. The wall 108 is generally arranged in a plane that is perpendicular to the stacking direction of the core stack 102, while the wall 109 is arranged in a place that is generally parallel to the core stacking direction. Along at least a portion of the walls 108 and 109, the part 121 defines an internally facing surface of the walls, and the part 120 defines an externally facing surface of the walls. First and second coolant flow paths 111a and 111b are arranged between the internally facing and the externally facing surfaces. A coolant port 104a is received into an aperture 124a provided in the wall 109 portion of the part 120. An aperture 110a is provided in the wall 108 portion of the part 121, and is disposed directly adjacent to a manifold 107a of the core stack 102. The coolant flow path 111a provides a fluid flow path between the port 104a and the aperture 110a to route coolant to or from the manifold 107a. Similarly, a coolant port 104b is received into an aperture 124b provided in the wall 109 portion of the part 120, and an aperture 110b is provided in the wall 108 portion of the part 121 directly adjacent to a manifold 107b of the core stack 102. The coolant flow path 111b provides a fluid flow path between the port 104b and the aperture 110b to route coolant to or from the manifold 107b.

It may be especially beneficial to join together the various components of the heat exchange core 102 (e.g. the coolant plates and the air fins) and at least some of the components of the enclosure 103 in a common brazing operation in order to construct the heat exchanger 101. This can be accomplished by manufacturing the individual parts from material such as aluminum alloys, and by providing a braze joint material at the joining locations. The assembled and fixtured parts can then be raised to an elevated temperature within a braze furnace in order to melt the braze alloy and allow it to fill the gaps between parts before re-solidifying. In so doing, the various joints that would be required to provide separately sealed flow paths through the heat exchanger 101 for both a flow of coolant and a flow of air can be formed in a single operation, making assembly of the heat exchanger 101 more economical. Braze joints created between the formed metal part 121 of the enclosure 103 and an adjacent plate of the core stack 102 in the region of the apertures 110 and manifolds 107 by such a brazing operation can provide the requisite seals to prevent leakage of the coolant flow into the air flow path, without the need for an additional sealing element.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

We claim:

1. A heat exchanger for cooling a flow of compressed air using a liquid coolant, comprising:
    a heat exchanger core comprising a plurality of coolant flow plates arranged into a stack extending in a stacking direction, air fins arranged between adjacent ones of the plurality of coolant flow plates to provide flow paths through the heat exchanger for the flow of compressed air, a coolant inlet manifold and a coolant outlet manifold defined by the stack of coolant flow plates, wherein the core is further defined by a plurality of planar core sides including core stack sides extending in the stacking direction and core terminal sides extending in a direction perpendicular to the stacking direction;
    an enclosure surrounding the stack of coolant flow plates and at least partially defining the flow path for the compressed air, the stack of the plurality of coolant flow plates is configured to be inserted into the enclosure, the enclosure comprising:
        one or more externally facing surfaces, each being arranged at one of the plurality of planar core sides;
        one or more internally facing surfaces, each being arranged at one of the plurality of planar core sides;
        a coolant port provided on a first externally facing surface of the one or more externally facing surfaces, the first externally facing surface located at one of the core stack sides;
        an aperture provided on a first internally facing surface of the one or more internally facing surfaces, the first internally facing surface located at one of the core terminal sides; and
    a coolant flow path extending between the coolant port and the aperture, the coolant flow path being at least partially located between the one or more internally facing surfaces and the one or more externally facing surfaces; and
    a seal arranged between the aperture and the stack of coolant flow plates, the seal providing leak-free fluid communication between the coolant port and one of the coolant inlet manifold and the coolant outlet manifold.

2. The heat exchanger of claim 1, wherein the coolant flow path includes a first portion extending in a direction that is generally parallel to the stacking direction, and a second portion extending in a direction that is generally perpendicular to the stacking direction.

3. The heat exchanger of claim 1, wherein the coolant flow path includes at least one right angle turn between the coolant port and the aperture.

4. The heat exchanger of claim 3, wherein the coolant flow path includes at least two right angle turns between the coolant port and the aperture.

5. The heat exchanger of claim 1, wherein the coolant port is a first coolant port, the aperture is a first aperture, the coolant flow path between the first coolant port and the first aperture is a first coolant flow path, and the seal is a first seal, further comprising:
    a second coolant port provided on one of the one or more external surfaces;
    a second aperture provided on one of the one or more internal surfaces;
    a second coolant flow path extending between the second coolant port and the second aperture, the second coolant flow path being at least partially located between the one or more internally facing surfaces and the one or more externally facing surfaces, the second coolant flow path being separated from the first coolant flow path; and a second seal arranged between the second aperture and the stack of coolant flow plates, the second seal providing leak-free communication between the second coolant port and the other of the coolant inlet manifold and the coolant outlet manifold.

6. The heat exchanger of claim 5, wherein the enclosure comprises:
a first formed sheet metal part having a first port receiving opening to receive the first coolant port and a second port receiving opening to receive the second coolant port; and
a second formed sheet metal part having the first and second apertures arranged thereon, wherein the first and second formed sheet metal parts together define the first and second coolant flow paths.

7. The heat exchanger of claim 6, wherein the first and second formed sheet metal parts are joined together in a common brazing operation with the plurality of coolant flow plates.

8. The heat exchanger of claim 1, wherein the first externally facing surface extends in the stacking direction from the coolant port to a location beyond the first internally facing surface.

9. The heat exchanger of claim 1, wherein the first externally facing surface intersects with a second externally facing surface that extends in the direction perpendicular to the stacking direction, wherein the second externally facing surface surrounds the aperture to cover the aperture, and wherein the first externally facing surface and the second externally facing surface are at least partially flat.

10. A heat exchanger for cooling a flow of compressed air using a liquid coolant, comprising:
a heat exchanger core comprising a plurality of coolant flow plates arranged into a stack extending in a stacking direction, air fins arranged between adjacent ones of the plurality of coolant flow plates to provide flow paths through the heat exchanger for the flow of compressed air, a coolant inlet manifold and a coolant outlet manifold defined by the stack of coolant flow plates, wherein the core is further defined by a plurality of planar core sides including core stack sides extending in the stacking direction and core terminal sides extending in a direction perpendicular to the stacking direction;
an enclosure at least partially surrounding the heat exchanger core and at least partially defining the flow path for the compressed air, the stack of the plurality of coolant flow plates is configured to be inserted into the enclosure, the enclosure comprising:
a plurality of internal wall surfaces bounding the flow of compressed air through the heat exchanger;
a plurality of external wall surfaces spaced away from the plurality of internal wall surfaces;
a coolant port provided on a first external wall surface of the plurality of external wall surfaces, the first external wall surface extending along a first core stack side of the core stack;
an aperture provided on a first internal wall surface of the plurality of internal wall surfaces, the first internal wall surface extending along one of the core terminal sides; and
a non-linear coolant flow path arranged between at least some of the external wall surfaces and at least some of the internal wall surfaces, the coolant flow path extending from the coolant port to the aperture; and
a seal arranged between the aperture and the stack of coolant flow plates, the seal providing leak-free fluid communication between the coolant port and one of the coolant inlet manifold and coolant outlet manifold,
wherein the coolant port is tubular with round sides and a round opening,
wherein the first external wall is at least partially planar and covers a planar wall of the enclosure that extends along the first core stack side, and
wherein the sides and the opening of the coolant port are arranged in-line with the planar wall of the enclosure.

11. The heat exchanger of claim 10, wherein the coolant flow path includes a first portion extending in a direction that is generally parallel to the stacking direction, and a second portion extending in a direction that is generally perpendicular to the stacking direction.

12. The heat exchanger of claim 10, wherein the coolant flow path comprises a first ninety degree bend and a second ninety degree bend.

13. The heat exchanger of claim 10, further comprising:
a second coolant port provided on one of the plurality of external wall surfaces;
a second aperture provided on one of the plurality of internal wall surfaces;
a second non-linear coolant flow path arranged between at least some of the external wall surfaces and at least some of the internal wall surfaces, the second coolant flow path extending from the second coolant port to the second aperture; and
a second seal arranged between the second aperture and the stack of coolant flow plates, the second seal providing leak-free fluid communication between the second coolant port and the other one of the coolant inlet manifold and coolant outlet manifold.

* * * * *